UNITED STATES PATENT OFFICE.

VICTOR G. BLOEDE, OF CATONSVILLE, MARYLAND.

PROCESS OF MANUFACTURING VEGETABLE GLUE.

1,257,307. Specification of Letters Patent. Patented Feb. 26, 1918.

No Drawing. Application filed October 29, 1917. Serial No. 198,989.

*To all whom it may concern:*

Be it known that I, VICTOR G. BLOEDE, a citizen of the United States, residing at Catonsville, in the county of Baltimore and State of Maryland, have invented new and useful Improvements in the Processes of Manufacturing Vegetable Glue, of which the following is a specification.

This invention relates to improvements in the manufacture of a glue or adhesive from amylaceous or starch bases, and has for its object the production of a vegetable glue in a more concentrated and workable form than can be obtained by any of the existing processes.

The production of a highly adhesive compound by acting upon starchy matter with caustic alkalis has been known, and in use for many years, but in addition to the great alkalinity of these products, which excludes their use for many purposes, there is another and greater objection, namely, that in order to secure the necessary adhesive qualities the material has to be made and used in the form of an extremely heavy bodied and highly tenacious paste, making the application of these products a rather difficult problem requiring special machinery and rendering such adhesives unfit for joint and similar wood-work in which a freely flowing composition is required.

In the past manufacturers of vegetable glue of this type have sought to secure this modification in the body or consistency of the product by the partial hydrolyzation of the starch, either in the dry or paste form, by the well known method of acting upon same by acids, heat or other agencies, but it has been found in practice that even a low degree of hydrolyzation of the starch by any of the ordinary dextrinizing processes greatly reduces the adhesiveness of the finished product, and more especially the tenacity or flexibility, or toughness of the vegetable glue so produced.

I have discovered a method of reducing the body, or tenacity of these compositions without any appreciable loss of adhesiveness or flexibility in the finished product, thereby making it possible to produce a vegetable glue of a much higher concentration, yet maintaining the fluidity of the product within workable bounds, which result can not be obtained by any of the processes now in use.

I accomplish these results by first acting upon starch with a caustic alkali in the usual manner, then neutralizing, or partly neutralizing, the product thus obtained and then acting upon this material with a starch-reducing ferment or enzym until the desired reduction of consistency has been secured.

There are, as is well known, a number of ferments or enzyms which act upon starch, very quickly reducing its body, the best known of these substances being the diastase produced from malt. There are also a number of species of bacillus which produce a similar thinning effect, and can be advantageously used in my process.

To carry out my process I proceed as follows:

In a steam jacketed kettle provided with a powerful mechanical agitator I place one hundred pounds of starch. To this I add one-hundred and fifty (150) pounds of cold water, and agitate the mass of starch and water until a smooth cream or paste is formed, free from clots and lumps. I then add two and a half to three pounds of caustic soda, previously dissolved in fifty pounds of water, and when all of these materials are well blended I turn on the steam and continue the heat until a clear amber colored composition is formed, and all the starch has been completely dissolved or jellied.

Up to this point the process is the same as in general use in the production of the ordinary alkaline vegetable glue now in extensive use. The composition in the kettle is now partly or wholly neutralized by treatment with a vegetable or mineral acid, and when the temperature of the composition has fallen to say—115 degrees, more or less, I work into the mass a ferment or enzym capable of reducing starch.

There are a number of these known to science which it is not necessary to name, as I have found any of the so-called starch reducing substances more or less adapted to use in my process.

It would be impossible to give definite weights or measurements as to the quantity of the ferment or bacillus to be used, as this depends upon both their strength and activity as well as the character of the starch operated upon, and the degree of neutrality and temperature and finally also the character of the product desired.

If the ferment or bacillus is of proper strength and character a few ounces diluted with water will suffice to secure various stages of liquefaction in a very short time.

I prefer to work with very dilute solutions and the smallest practicable quantity, and find that on an average I can secure the desired thinning of the material within the short space of thirty minutes. I have found the best way to operate to be adding a few ounces of the diluted germ or culture to the starch composition, allowing it to act for a few minutes followed by another addition within ten or fifteen minutes, the addition being stopped just as soon as the thinning of the viscous starchy mass is noted, and continuing the action, preferably under constant agitation, until the exact degree of consistency desired in the finished product has been secured.

As the thinning takes place quite rapidly it is well to stop the operation while the mass is still thicker than is desired when finished.

Just as soon as the desired body or consistency has been reached in the composition the further action of the converting agent is stopped by bringing the temperature of the material as rapidly as possible up to, or near the boiling point, and continuing the heat until all live germs have been destroyed.

Other methods are available for stopping the conversion, such as the addition of strong antiseptics, or germ destroyers, but I have found rapid heating the best and simplest process for this purpose.

I have found in practice that a neutral or slightly acid condition is most favorable to the rapid operation of the germs, but I have also secured very good, although slower results, by the use of a slightly alkaline starch composition. for instance, one in which the caustic alkali has been reduced to a carbonate by the action of carbonic acid.

There appears to be quite a difference in the quality of the product, its color, toughness, etc., according to the character of the conversion, that from slightly alkaline compositions apparently possessing greater strength than the products of an acid starch composition.

There is an alternative method of operating this process, which, especially in unskilled hands, yields very much better and more uniform and reliable results than the process just described.

This second method consists in removing a portion of the material in the kettle, after the starch has been cooked with caustic alkali and neutralized, placing it in a suitable converter and acting upon same with the ferment or bacillus in a separate vessel, and when thinned to the desired degree, and the action of the converting agent stopped in the manner described, returning this converted portion of the material to the first kettle and agitating the two portions until a complete blending has been effected.

Where an alkaline or caustic condition is not objectionable, or is desirable, in the vegetable glue, the caustic product described in the first step of the operation, I secure the desired thinning of the heavy viscous mass by adding to it, in such proportions as may be found desirable, a vegetable glue of thin body secured by the action of an enzym or bacillus.

So far as I have been able to ascertain these ferments, enzyms or bacilli will not convert or thin a starch composition strongly alkaline in re-action, wherefore if it is desired to maintain a considerable degree of alkalinity in the product, as is customary in wood working, it is necessary either to neutralize a portion of the product obtained by the action of caustic alkali on starch bases described in the first step of my process, or prepare a separate batch and neutralize same before reducing to the desired degree by the action of the enzym or bacillus, keeping this reduced material in stock and adding same to the caustic starch composition in such quantity as may be necessary to secure the degree of fluidity desired.

It is obvious that by this method any degree of body or viscosity can be readily secured in the finished product, and which fluidity can be lowered or increased as rapidly as the character of the changes in the work to be done with it may require.

The product resulting from my process is a very distinct improvement on any form of vegetable glue hitherto known or used, either in wood working, such as veneer, panel and joint work, or for paper, pasteboard, etc.

It can be made in any desired body, has great adhesive and tensile strength, dries far tougher and more elastic than the ordinary alkaline vegetable glue and can be used in the same manner as an ordinary animal glue for many purposes, that is without requiring special machinery as is the case with the ordinary vegetable glue as used in woodworking.

In carrying out my process I do not confine myself to any particular form of starch, nor to the exact proportion I have given as an example in this specification. Nor do I confine myself to any particular acid in neutralizing, or any special ferment, enzym or bacillus in converting.

I am aware that there is nothing novel or patentable in the process of acting upon starch with a caustic alkali, and I am also aware that the action of certain ferments, enzyms and bacilli in converting and thinning starch has been known for a number of years, hence I do not claim any of these processes broadly, but:

I claim,

1. The process herein described for producing a vegetable glue or adhesive of any degree of body or viscosity desired by first treating the starch base with a caustic alkali, then partially or fully neutralizing the alkali and acting upon the composition so obtained with a ferment, enzym or bacillus capable of reducing starch, until the composition has been reduced to the desired consistency or flow, substantially as described.

2. The process herein described consisting in preparing an alkaline or neutral vegetable glue by acting upon the starch base with a caustic alkali, then neutralizing the alkali and adding to the viscous material so produced a sufficient quantity of a thin vegetable glue produced by the action of a ferment, enzym or bacillus to reduce the viscous body to the desired degree of fluidity, substantially as described.

3. The process herein described consisting in acting upon a starch base with a caustic alkali and reducing the highly viscous alkaline material thus obtained, while in an unneutralized, or partly neutralized condition, to the desired degree of fluidity by the addition of a thin vegetable glue obtained by the action of a ferment, enzym, or bacillus, upon starch, substantially as described.

VICTOR G. BLOEDE.

Witnesses:
ELMER L. GREENSFELDER,
E. B. WILLIAMS.